(12) United States Patent
Yasuda et al.

(10) Patent No.: US 11,646,006 B2
(45) Date of Patent: May 9, 2023

(54) SETTING DEVICE, OPERATING ELEMENT AND SETTING METHOD

(71) Applicant: YAMAHA CORPORATION, Hamamatsu (JP)

(72) Inventors: Yoshihiko Yasuda, Hamamatsu (JP); Yuji Yamada, Hamamatsu (JP); Yosuke Kawata, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 159 days.

(21) Appl. No.: 17/108,328

(22) Filed: Dec. 1, 2020

(65) Prior Publication Data

US 2021/0183346 A1 Jun. 17, 2021

(30) Foreign Application Priority Data

Dec. 13, 2019 (JP) .............................. JP2019-225847

(51) Int. Cl.
*G10H 1/00* (2006.01)
*G10H 1/34* (2006.01)
*G10H 1/18* (2006.01)
*G06F 3/04847* (2022.01)

(52) U.S. Cl.
CPC ....... *G10H 1/0008* (2013.01); *G06F 3/04847* (2013.01); *G10H 1/18* (2013.01); *G10H 1/344* (2013.01); *G10H 2220/091* (2013.01); *G10H 2220/221* (2013.01)

(58) Field of Classification Search
CPC ........ G10H 1/0008; G10H 1/18; G10H 1/344; G10H 2220/091; G10H 2220/221; G06F 3/04847

USPC .......................................................... 84/615
See application file for complete search history.

(56) References Cited

U.S. PATENT DOCUMENTS

| | | | | |
|---|---|---|---|---|
| 2016/0259540 A1* | 9/2016 | Hole | ...................... | G06F 3/0483 |
| 2019/0251936 A1* | 8/2019 | Hiruma | .................. | G09B 15/00 |
| 2021/0151015 A1* | 5/2021 | Recchia | .............. | G10H 1/0016 |
| 2021/0183346 A1* | 6/2021 | Yasuda | ............... | G10H 1/0008 |
| 2021/0225341 A1* | 7/2021 | Tougher | .................... | G06F 3/02 |

(Continued)

FOREIGN PATENT DOCUMENTS

| | | | | |
|---|---|---|---|---|
| CN | 107111445 B | * | 3/2022 | ............. B60K 35/00 |
| DE | 102019204046 B4 | * | 7/2021 | ......... B60H 1/00985 |

(Continued)

*Primary Examiner* — Christina M Schreiber
(74) *Attorney, Agent, or Firm* — Rossi, Kimms & McDowell LLP

(57) ABSTRACT

A setting device includes an operating element and a light-emitting device. The operating element is used for specifying a setting value of a first parameter by moving the operating element within a first region. The light-emitting device includes a second region that is disposed inside the first region. The second region includes a light-emitting area that changes according to the setting value. The operating element covers part of the second region. The operating element is an operating element for specifying a setting value of a first parameter related to sound by moving the operating element relative to a housing. The operating element includes a first portion and a second portion. The first portion blocks light. The second portion transmits light from a first surface of the operating element to a second surface facing the first surface.

8 Claims, 10 Drawing Sheets

(56) References Cited

U.S. PATENT DOCUMENTS

2021/0295810 A1* 9/2021 Sasaki .................... G10H 1/344
2022/0095440 A1* 3/2022 Van Der Sloot .... G06F 3/04847
2022/0180847 A1* 6/2022 Imamura ................ G10H 1/344

FOREIGN PATENT DOCUMENTS

| JP | 2008116760 A | * | 5/2008 |
| JP | 2009244924 A | * | 10/2009 |
| JP | 2009244924 A |   | 10/2009 |

* cited by examiner

SETTING DEVICE, OPERATING ELEMENT AND SETTING METHOD

CROSS-REFERENCE TO RELATED APPLICATIONS

This application is based upon and claims the benefit of priority from the prior Japanese Patent Application No. 2019-225847, filed on Dec. 13, 2019, the entire contents of which are incorporated herein by reference.

FIELD

The present disclosure relates to a device for setting a parameter.

BACKGROUND

An electronic musical instrument can change the tone based on various parameters. Values of the parameters are changed by an operating element provided in the electronic musical instrument. This operating element also allows the user to change the tone during the performance. Depending on the circumstances during the performance, operating element itself may be difficult to see, and the indicated value of the operating element is desired to be a higher visibility. For example, Japanese laid-open patent publication No. 2009-244924 discloses a technique of displaying scale images corresponding to the indicated value of the operation element nearby the operating element.

SUMMARY

A setting device according to an embodiment of the present disclosure includes an operating element and a light-emitting device. The operating element is used for specifying a setting value of a first parameter by moving the operating element within a first region. The light-emitting device includes a second region that is disposed inside the first region. The second region includes a light-emitting area that changes according to the setting value. The operating element covers part of the second region.

An operating element according to an embodiment of the present disclosure is an operating element for specifying a setting value of a first parameter related to sound by moving the operating element relative a housing. The operating element includes a first portion and a second portion. The first portion blocks light. The second portion transmits the light from a first surface of the operating element to a second surface facing the first surface.

DESCRIPTION OF EMBODIMENTS

Figure 1:
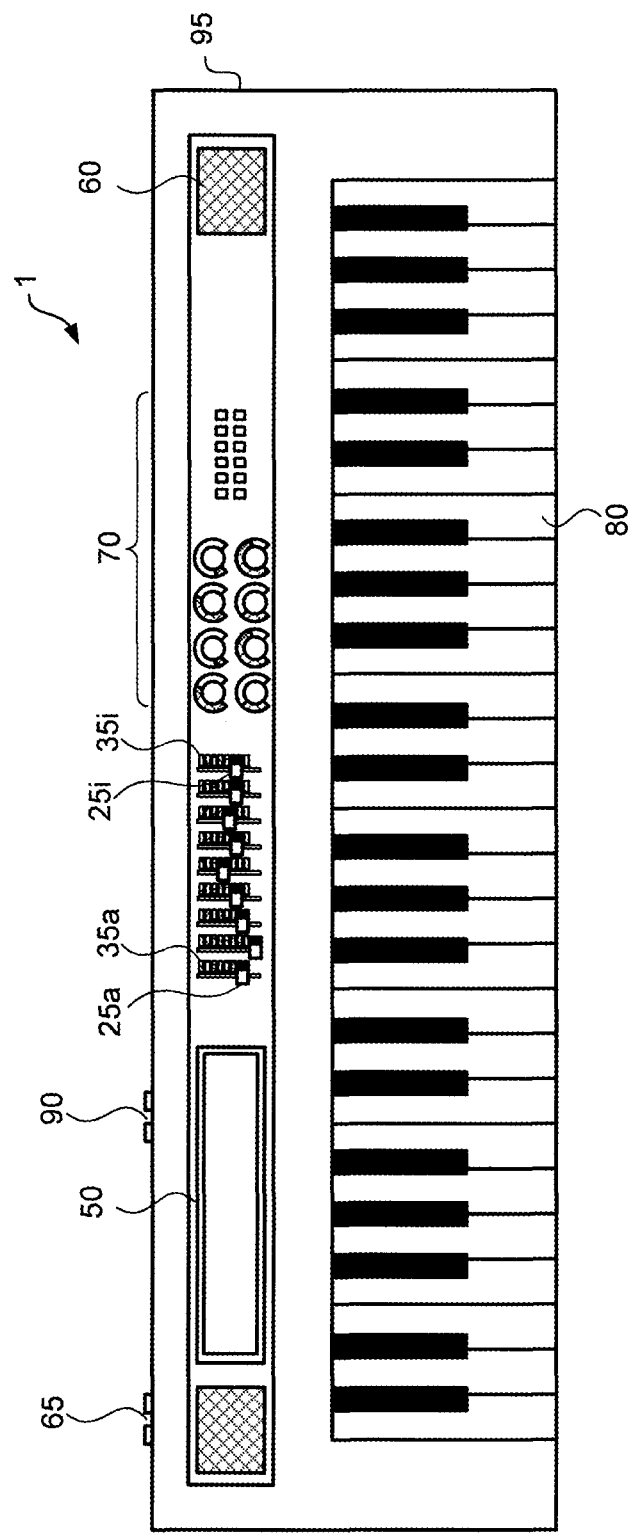
FIG. 1 is a diagram illustrating an external view of an electronic keyboard device according to a first embodiment of the present disclosure.

Hereinafter, an electronic keyboard device according to an embodiment of the present disclosure will be described in detail by referring to drawings. The following embodiments are examples of embodiments of the present disclosure, and the present disclosure is not to be construed as being limited to these embodiments. In the drawings referred to in the present embodiments, the same portions or portions having similar functions are denoted by the identical signs or similar signs (signs each formed simply by adding A, B, etc. to the end of a number), and a repetitive description thereof may be omitted. For convenience of description, the dimensional ratio of the drawings may be different from the actual ratio, or a part of the configuration may be omitted from the drawings.

First Embodiment

[1. Electronic Keyboard Device]

FIG. 1 is a diagram illustrating an external view of an electronic keyboard device according to the first embodiment of the present disclosure. An electronic keyboard device 1 is a synthesizer including a keyboard unit 80. The keyboard unit 80 includes a plurality of keys supported by a housing 95. The electronic keyboard device 1 generates a sound signal in response to a user operating a key or in response to a sequencer instructing a reproduction of music data. The sound signal is output from a signal output unit 65. The sound signal may be output from a speaker 60.

The electronic keyboard device 1 can change a setting value of a plurality of parameters for generating the sound signal by using a plurality of slide operating elements 25a to 25i (nine in this example) arranged in the housing 95. The slide operating elements 25a to 25i also allow the sounds to be output to be changed in real time. Hereinafter, when the slide operating elements 25a to 25i need not be described separately, they may be simply referred to as the slide operating element 25. In this example, the slide operating elements 25a to 25i are operating elements for obtaining the same effects as a drawbar used in a tone-wheel organ. That is, the slide operating elements 25a to 25i are used to control the harmonic component of the organ tone, respectively. An operation unit 70, such as rotary encoders and switches, may also be used to change the setting value of the parameter.

indicator units 35a to 35i for displaying positions indicated by the slide operating elements 25a to 25i are arranged corresponding to the slide operating elements 25a to 25i respectively. Hereinafter, the indicator units 35a to 35i may be collectively referred to as an indicator unit 35. A relation between the slide operating element 25 and the indicator unit 35 will be described in detail later. In the following description, for convenience of description, "the side on which a performer is present relative to the electronic keyboard device 1" is defined as the "frontside". "the other side opposite to the performer relative to the electronic keyboard device 1" is defined as the "backside". The "side where the keyboard unit 80 exists relative to the housing 95" can also be referred to as the "frontside". "Frontside" may be referred to as "anterior". The "backside" may also be referred to as the "posterior". Left, right, up, and down are also defined as directions when viewed the electronic keyboard device 1 from the performer.

Control of tone is achieved by many parameters. On the other hand, in order to control many parameters in real time, many operating elements are required. When the slide operating elements with scale images nearby are arranged in order, the slide operating elements and the scale images are alternately arranged. Therefore, depending on the distance from the adjacent slide operating element, the correspondence between the indicated value of the slide operating element and the scale image may be difficult to see. According to the electronic keyboard device 1 of the present disclosure, it is possible to improve the visibility of displays corresponding to the indicated value of the operating element. Hereinafter, a configuration of the electronic keyboard device 1 will be described in detail referring to FIG. 2.

Figure 2:
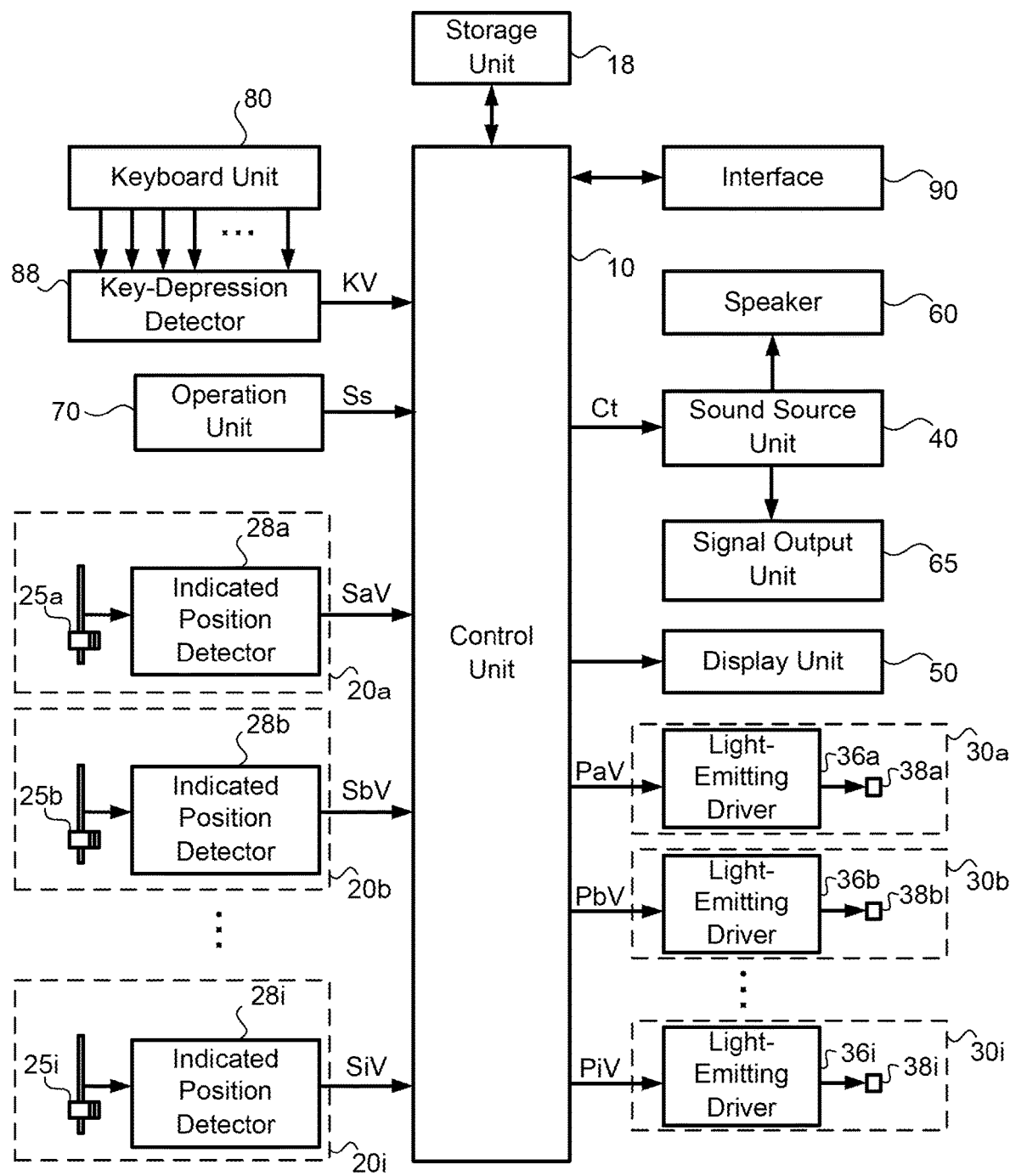
FIG. 2 is a diagram for explaining a configuration of the electronic keyboard device in the first embodiment of the present disclosure.

FIG. 2 is a diagram illustrating a configuration of the electronic keyboard device according to the first embodiment of the present disclosure. The electronic keyboard device 1 includes a control unit 10, a storage unit 18, input devices 20a to 20i, light emitting devices 30a to 30i, a sound source unit 40, a display unit 50, the speaker 60, the signal output unit 65, the operation unit 70, the keyboard unit 80, and an interface 90. Hereinafter, if the input devices 20a to 20i do not need to be described separately, it may be simply referred to as an input device 20. If the light emitting devices 30a to 30i do not need to be described separately, it may be simply referred to as a light emitting device 30. The light-emitting device 30 includes the indicator unit 35, a light-emitting driver 36, and a light-emitting element 38. The indicator units 35a to 35i, the light-emitting drivers 36a to 36i, and the light-emitting elements 38a to 38i respectively correspond to each other. Hereinafter, if the light-emitting drivers 36a to 36i do not need to be described separately, it may be simply referred to as the light-emitting driver 36. The light-emitting driver 36 controls contents displayed by the indicator unit 35 corresponding to itself.

The electronic keyboard device 1 includes a plurality of sensors. In this example, the plurality of sensors include indicated position detectors 28a to 28i and a key-depression detector 88. Hereinafter, when the indicated position detectors 28a to 28i do not need to be described separately, it may be simply referred to as an indicated position detector 28. The input device 20 described above includes the slide operating element 25 and the indicated position detector 28.

The control unit 10 is an example of a computer that includes a calculation processing circuit such as a CPU, and a storage device such as RAM, ROM, and the like. The control unit 10 executes control programs stored in the storage unit 18 by the CPU to realize various functions in the electronic keyboard device 1 by instructions written in the programs. The various functions include a sound control function 100 described below (referring to FIG. 5). The programs may be provided from an external device and installed in the storage unit 18.

The keyboard unit 80 includes a plurality of keys rotatably supported by the housing 95. The key-depression detector 88 outputs a detection signal KV to the control unit 10. The detection signal KV corresponds to the information that indicate the depressed key and the depression amount of the key (e.g., velocity, time variation). The operation unit 70 is a device such as an operating button, a rotary encoder. An instruction for the electronic keyboard device 1 is input to the operation unit 70 by the user. The operation unit 70 outputs an operation signal Ss corresponding to the user's instruction to the control unit 10. The user's instruction includes instruction for registering a setting with respect to the indicated position of the slide operating element 25 and instruction for updating a setting with respect to the indicated position based on setting data.

The storage unit 18 is the storage device such as a non-volatile memory and includes a region for storing the control programs executed by the control unit 10 and a region for storing parameters for use in controlling the sound source unit 40. Of these parameters, the setting data is registered in a setting storage area 181 (referring to FIG. 5). The setting data is data defining the setting with respect to the indicated position of the slide operating element 25. A plurality of setting data may be registered in the setting storage area 181. As described above, in response to the instruction by the user, the setting data is registered in the storage unit 18 or is read from the storage unit 18.

The display unit 50 is a display device such as a liquid crystal display and displays various screens under the control by the control unit 10. In this example, the interface 90 includes a terminal for connecting the external device, such as a control device, to the electronic keyboard device 1. The interface 90 may include a terminal or the like for transmitting and receiving MIDI data.

The sound source unit 40 generates a sound signal based on a sound source control signal Ct output from the control unit 10. The generated sound signal may be supplied to the signal output unit 65 and further supplied to the speaker 60. Whether the sound signal is output to the speaker 60 may be determined according to the setting. The sound source control signal Ct includes information required for generating the sound signal, such as information for controlling generation of sounds such as a note number, a note on, and a note off, and information for controlling effects such as a reverb, a chorus, a phaser, and a wah. In this example, the information required to generate the sound signal also includes information for controlling the amount of harmonic components of the organ.

The sound source unit 40 may be realized by hardware, such as a DSP, or may be realized by software. In the latter case, the function of the sound source unit 40 may be realized by executing a program stored in a memory or the like by the CPU. Some of the functions of the sound source unit 40 may be realized by software and the rest by hardware.

The signal output unit 65 is a terminal configured to output the sound signal supplied from the sound source unit 40 to the external device. The speaker 60 amplifies and outputs the sound signal supplied from the control unit 10 or the sound source unit 40, thereby emitting sound corresponding to the sound signal.

The slide operating element 25 (25a to 25i) is arranged side by side along a scale direction (second direction) in which the keys are arranged. The scale direction corresponds to the lateral direction (left/right direction). The slide operating element 25 is moved in a direction perpendicular to the scale direction (first direction), it is possible to change the indicated position in a plurality of stages (nine stages in this example). Hereinafter, the direction in which the slide operating element 25 moves may be referred to as a sliding direction.

The indicated position detector 28 detects the indicated position of the slide operating element 25, and outputs an operation value corresponding to the indicated position to the control unit 10. The operation values SaV, SbV, . . . , SiV respectively correspond to the operation values output from the indicated position detectors 28a to 28i. Hereinafter, when the operation values SaV to SiV do not need to be described separately, it may be simply referred to as an operation value SV. The operation value SV is information that indicate the indicated position of the slide operating element 25, and in this example, the operation value SV indicates the indicated position in nine steps from "0" to "8".

The indicator unit 35 displays the indicated value of the corresponding slide operating element 25. In this example, by the light-emitting drivers 36a to 36i respectively controlling the emission state of a light-emitting element based on light-emission control signals PaV to PiV, the indicator unit 35 displays the setting value (the indicated value based on the indicated value of the slide operating element 25 or the indicated value of the setting data) of the parameter by the control unit 10 on the indicator unit 35. Hereinafter, when the light-emission control signals PaV and PiV do not need to be described separately, it may be simply referred to as a light-emission control signal PV. The light-emission control signal PV is output by the control unit 10.

[2. Setting Device]

Next, the input device 20 and the light emitting device 30 will be described in more detail. Here, the input device 20 and the light emitting device 30 are collectively referred to as a setting device 2 for specifying the setting value of the parameter. Here, the configuration of one pair of the input device 20 and the light emitting device 30 will be described referring to FIGS. 3 and 4.

Figure 3:
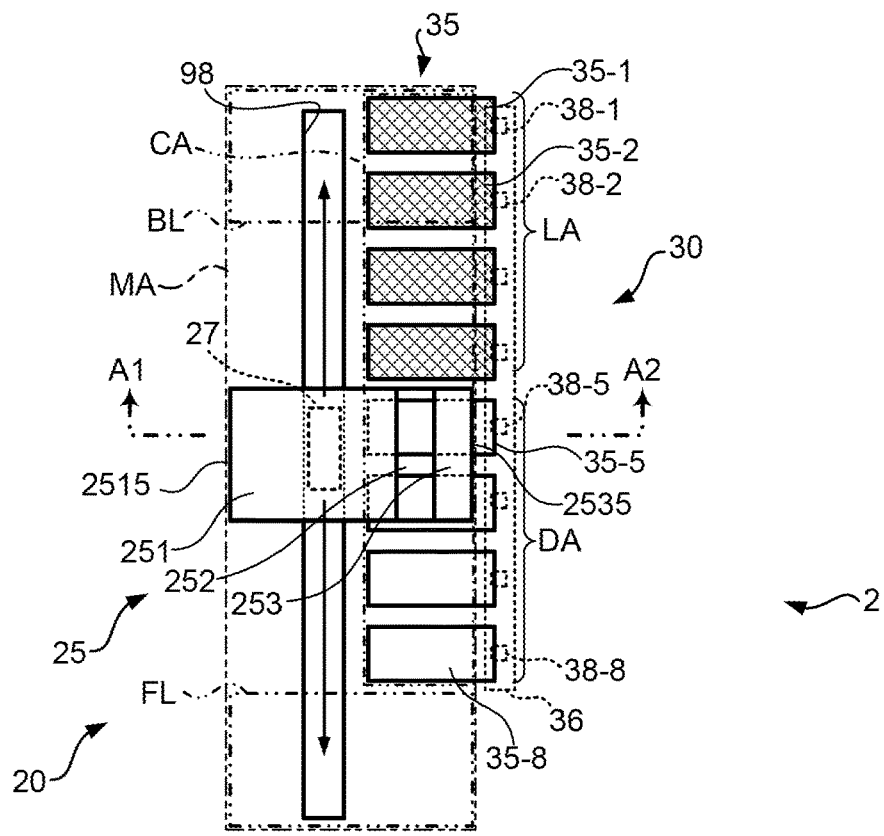
FIG. 3 is a diagram illustrating an external view of a setting device according to the first embodiment of the present disclosure.
Figure 4:
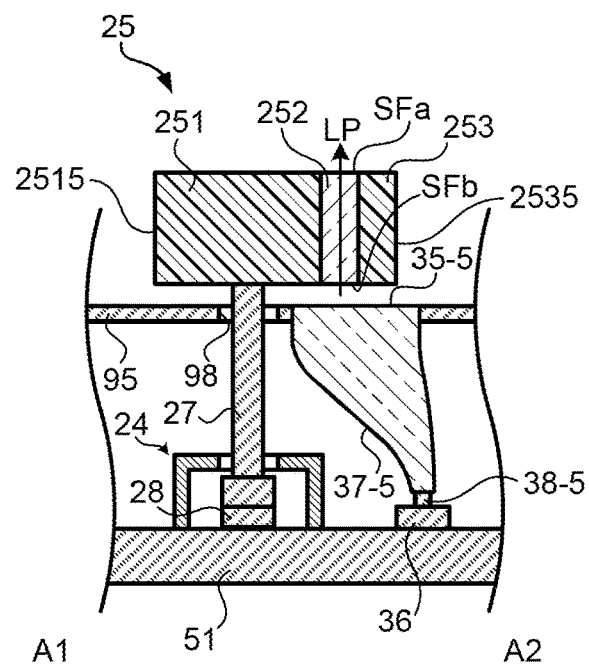
FIG. 4 is a diagram illustrating a cross-sectional structure (cutting line A1-A2) of the setting device according to the first embodiment of the present disclosure.

FIG. 3 is a diagram illustrating an external view of the setting device according to the first embodiment of the present disclosure. FIG. 4 is a diagram illustrating a cross-sectional structure (cutting line A1-A2) of the setting device according to the first embodiment of the present disclosure. In the description of FIG. 3, according to the above definition, the upper part of the drawing corresponds to the backside, and the lower part of the drawing corresponds to the frontside. The slide operating element 25 is a substantially rectangular parallelepiped shape that includes light-blocking members 251, 253 (first portion) blocking light and a light-transmission member 252 (second portion) transmitting light. Each of the light-blocking members 251, 253 and the light-transmission member 252 is a substantially rectangular parallelepiped shape but may be another shape. Each of the light-blocking members 251, 253, and the light-transmission member 252 is formed of a resin, but at least one of the resins may be formed of a metal, a ceramic, a glass, or the like.

In this example, the light-blocking member 251, the light-transmission member 252, and the light-blocking member 253 are arranged in this order along the lateral direction. The light-transmission member 252 (light transmissive portion) is sandwiched between the light-blocking member 251 and the light-blocking member 253 to form a light guide path LP for guiding the light. The light guide path LP guides the light incident from a lower surface SFb (second surface) of the slide operating element 25 to an upper surface SFa (first surface) facing the lower surface SFb. The light-transmission member 252 is arranged to have a longitudinal length along the sliding direction. The light-transmission member 252, in this example, has a longitudinal length from an end of the frontside to an end of the backside with respect to the slide operating element 25. As a result, the slide operating element 25 has a configuration in which the portion blocking light is divided into two regions by the portion transmitting light.

A support rod 27 is a square column member, and connects the slide operating element 25 and a sliding mechanism 24. One end of the support rod 27 is connected to the lower SFb-side of the light-blocking member 251. A slit 98 for the support rod 27 passing is arranged in the housing 95. The sliding mechanism 24 is arranged on a print substrate 51 and includes a mechanism for movably holding the slide operating element 25 within a moving region MA (first region). A position of the slide operating element 25 as the most backside of the moving region MA is referred to as a rear-end position BL, a position of the slide operating element 25 as the most frontside of the moving region MA is referred to as a front-end position FL.

The indicated position detector 28 is arranged on the print substrate 51, and detects the position along the sliding direction of the slide operating element 25. The detected position corresponds to the position when dividing between the front-end position FL and the rear-end position BL as described above in nine stages. Here, the indicator unit 35 detects the position as "0" when the slide operating element 25 is at the rear-end position BL, and detects the position as "8" when it is at the front-end position FL. In the embodiment shown in FIG. 3, the slide operating element 25 is detected as the position of "4".

The indicator unit 35 includes display surfaces 35-1, 35-2, . . . , 35-8, all of which are arranged in the housing 95 and are substantially rectangular. The display surfaces 35-1, 35-2, . . . , 35-8 are arranged in order from the rear-end position BL side toward the front-end position FL side. Of the display surfaces 35-1, 35-2, . . . , 35-8, the positional relation between the slide operating element 25 and the indicator unit 35 is defined so that the number of display surfaces corresponding to the value of the indicated position of the slide operating element 25 is positioned on the backside of the slide operating element 25. For example, as shown in FIG. 3, when the slide operating element 25 is present in the position of "4", a state in which the display surfaces 35-1 to 35-4 are positioned on the backside of the slide operating element 25.

In the exemplary embodiment shown in FIG. 3, the display surfaces 35-1 to 35-4 positioned on the backside of the slide operating element 25 is a light-emitting region LA, and the display surfaces 35-5 to 35-8 are non-light-emitting regions DA. In other words, the number of display surfaces corresponding to the indicated position of the slide operating element 25 becomes the light-emitting state, and the light-emitting region LA is formed. Of the light-emitting region LA, when at least one display surface between a display surface covered with the slide operating element 25 (in this example the display surface 35-5) and the most backside display surface 35-1 is emitting light, any of the display surface may not be emitting light.

On the other hand, when an instruction for updating the setting of the indicated position based on the setting data is input by the user, the light emission of the display surface is controlled regardless of the position of the slide operating element 25. For example, even if the position of the slide operating element 25 remains in the position shown in FIG. 3, in some cases all of the display surface 35-1 to the display surface 35-8 becomes the light-emitting region LA.

The slide operating element 25 covers at least a part of the display surfaces 35-1 to 35-8, except positioning on the front-end position FL. Of the display surfaces 35-1 to 35-8, a region that may be covered with the slide operating element 25 is referred to as an overlapping region CA (second region). In at least a part of the moving area MA of the slide operating element 25, a part of the overlapping region CA is covered with the slide operating element 25. In this example, only an end 251S of the ends 251S and 253S in the lateral direction with respect to the slide operating element 25 is positioned outside the overlapping region CA when the slide operating element 25 covers the display surface. Therefore, on the end 253S side of the slide operating element 25, the light-emitting region exists outside the overlapping region CA.

In this example, when the slide operating element 25 is positioned on the front-end position FL, since none of the display surface of the indicator unit 35 is covered, it can be said that the structure is as follows. The length of the overlapping region CA in the sliding direction is shorter than that of the moving region MA. The distance between the backside end of the overlapping region CA (first end of the second region) and the backside end of the moving region MA (first end of the first region) is shorter than the distance between the frontside end (second end of the second region) of the overlapping region CA and the frontside end of the moving region MA (second end of the first region).

The light-emitting driver 36 causes light-emitting elements 38-1, 38-2, . . . 38-8 to emit light based on the light-emission control signal PV. When the light-emitting elements 38-1 to 38-8 do not need to be described separately, it may simply be referred to as a light-emitting element 38. The light-emitting element 38 is an LED in this example. Hereinafter, a structure in which the light emission of the light-emitting element 38 is guided to the display surface 35 will be described. As shown in FIG. 4, between the light-emitting element 38-5 and the display surface 35-5, a light guiding member 37-5 for guiding the light generated by the light-emitting element 38-5 to the display surface 35-5 is arranged. Thus, by the light-emitting element 38-5 emitting light, it appears that the display surface 35-5 is emitting light. For the light guiding member 37, a member having a light diffusion effect such as a diffuser, a member having a reflection effect for preventing light such as a reflector from leaking to the outside may be used. As a result, the light from the light-emitting element 38-5 is guided to spread over the display surface 35-5.

The light guiding members 37-1, 37-2, . . . , 37-8 are arranged between the display surfaces 35-1, 35-2, . . . , 35-8 and the corresponding light-emitting elements 38-1, 38-2, . . . , 38-8. When the light guiding members 37-1 to 37-8 do not need to be described separately, it may simply be referred to as the light guiding member 37. In FIG. 3, to avoid the complication of the drawing, the light guiding member 37 is not shown.

The presence of the sliding mechanism 24 may make it difficult for the light-emitting element 38-5 to be arranged directly below the display surface 35-5. In particular, the arrangement of the light-emitting element is more affected by the sliding mechanism 24 directly below the overlapping region CA of the display surface 35-5, for example, there is no space to arrange the light-emitting element 38-5 due to the presence of the sliding mechanism 24 below the slide operating element 25, the light-emitting element 38-5 must be arranged close to the sliding mechanism 24, etc. Even in such cases, the presence of the light guiding member 37-5 allows the display surface in the overlapping region CA to emit light even if the light-emitting element 38-5 is arranged at a position away from the sliding mechanism 24, that is, at a position other than the position directly below the overlapping region CA. When viewed from the upper surface SFa side of the slide operating element 25 as in FIG. 3, it is also possible to arrange the light-emitting element 38 on the outside of the overlapping region CA. When there is a space in the overlapping region CA to arrange the light-emitting element 38, the light-emitting element 38 may be arranged in the overlapping region CA.

By arranging the slide operating element 25 and the display surfaces 35-1 to 35-8 to form the overlapping region CA, the correspondence between the slide operating element 25 and the indicator unit 35 are clarified. When the slide operating element 25 is used as the drawbar for organ tonal control, by the light-emitting region LA that expands in conjunction with the slide operation of the slide operating element 25 from the backside end of the overlapping region CA (the first end) to the slide operating element 25, it is also possible to simulate the structure and feel of the tone-wheel organ drawbar.

On the other hand, it is assumed that the display surface 35-5 emits light in response to updating the setting of the indicated position. The display surface 35-5 is covered with the slide operating element 25. Therefore, if the slide operating element 25 does not have the light-transmission member 252, the user cannot easily recognize whether the display surfaces 35-1 to 35-5 are emitting light or the display surfaces 35-1 to 35-4 are emitting light (the display surface 35-5 is in a non-light-emitting state). The light-transmission member 252 included in the slide operating element 25 guides the light emitted from the display surface 35-5 from the lower surface SFb to the upper surface SFa. Therefore, the user can clearly visually recognize the display surface 35-5 covered with the slide operating element 25 from the outer surface side of the slide operating element 25.

Even if the light-transmission member 252 is not present, according to this example, since a region not included in the overlapping region CA of the display surface 35-5, that is, a region not covered with the slide operating element 25 is present, the user can confirm whether or not the display surface 35-5 emits light from the region. Thus, the light-transmission member 252 may not be present. The light-transmission member 252 is preferably present because visibility without the light-transmission member 252 is less than that with the light-transmission member 252.

[3. Configurations of Sound Control Function]

Next, the sound control function 100 realized in the control unit 10 will be described referring to FIG. 5.

Figure 5:
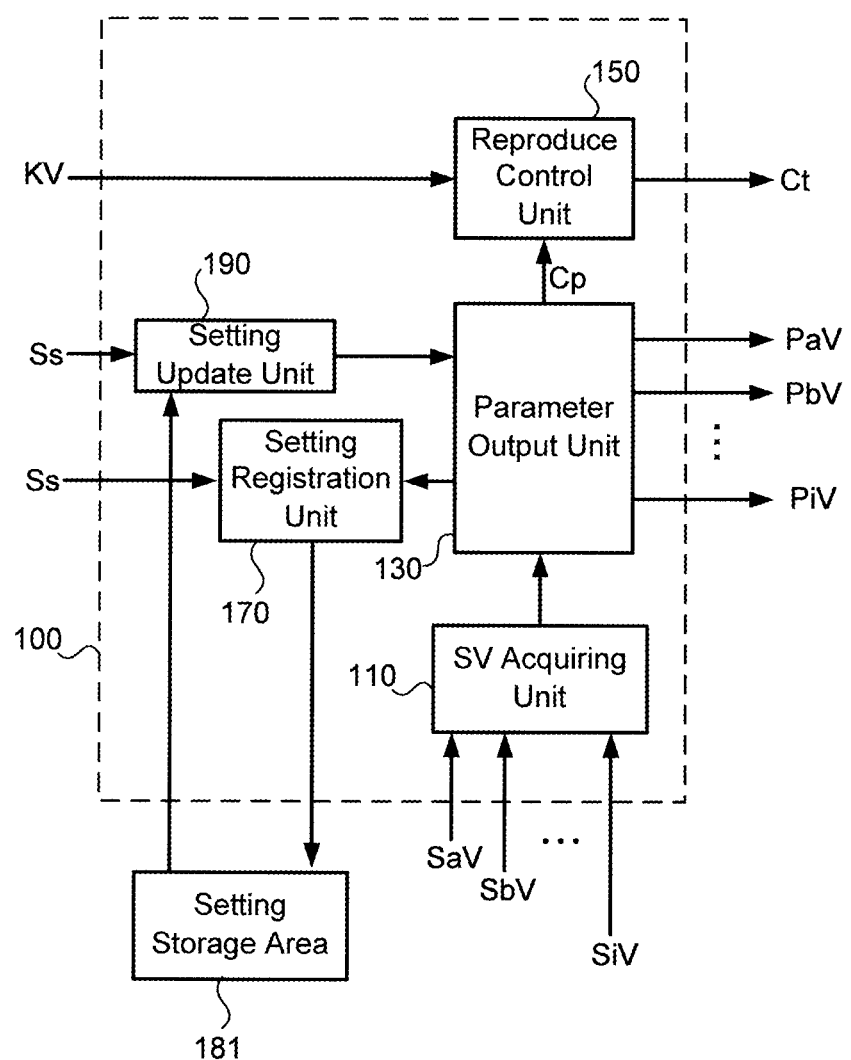
FIG. 5 is a diagram illustrating a sound control function according to the first embodiment of the present disclosure.

FIG. 5 is a diagram illustrating a sound control function according to the first embodiment of the present disclosure. The control unit 10 (controller) executes the control programs to realize the sound control function 100 in the electronic keyboard device 1. The configurations realizing the sound control function 100 include an SV acquiring unit 110, a parameter output unit 130, a reproduce control unit 150, a setting registration unit 170 and a setting update unit 190. All of these configurations may be realized by software, or at least a part thereof may be realized by hardware.

The SV acquiring unit 110 supplies the operation values SaV to SiV to the parameter output unit 130 in response to acquiring the operation values SaV to SiV. Each time the indicated position of the slide operating element 25 is changed, the operation value SV is acquired by the SV acquiring unit 110.

The parameter output unit 130 acquires the respective indicated positions of the slide operating elements 25a to 25i. The parameter output unit 130 buffers the last acquired indicated position of the slide operating element 25, updates the buffered indicated position each time a newly indicated position is acquired, and outputs a parameter value Cp corresponding to the indicated position (in this example, a value corresponding to the harmonic component amount of the control target) to the reproduce control unit 150. In this manner, the parameter output unit 130 sets the parameter value for controlling the sound based on the input instruction.

In addition, the parameter output unit 130 outputs the light-emission control signals PaV to PiV for displaying the indicator units 35a to 35i according to the indicated position of the slide operating elements 25a to 25i respectively. In this example, as described in FIG. 3, of the display surfaces 35-1 to 35-8 in the indicator unit 35, the light-emission control signal PV is output so that a display surface positioned on the backside of the slide operating element 25 emits light. The parameter output unit 130, even when the indicated position buffered is updated by the setting update unit 190 to be described later, transmits the parameter value Cp and the light-emission control signal PV in the same manner as when acquiring the operation value SV from the SV acquiring unit 110.

The setting registration unit 170 reads out the indicated position of the slide operating element 25 buffered in the parameter output unit 130 in response to acquiring the operation signal Ss for instructing of registering the setting of the indicated position of the slide operating element 25, and registers the operation signal Ss as the setting data in the setting storage area 181.

The setting update unit 190 reads out the setting data from the setting storage area 181 in response to acquiring the operation signal Ss for instructing of updating the setting of the indicated position of the slide operating element 25, and updates the indicated position buffered in the parameter output unit 130.

The reproduce control unit 150 generates the sound source control signal Ct in response to acquiring the detection signal KV so that the sound signal to be generated based on the detection signal KV is also generated in the sound source unit 40. The sound source control signal Ct is output so that the sound signal based on the detection signal KV is also varied by the parameter value Cp output from the parameter output unit 130. The sound control function 100 has been described above.

[4. Display Examples of Indicator Unit 35]

Next, a display example of the indicator unit 35 and a change example when the setting of the indicated value is updated will be described. Here, a change in the display of the indicator unit 35 when the processing of the indicated position proceeds in the order of registering the setting, changing the setting, and updating the setting will be described.

Figure 6:
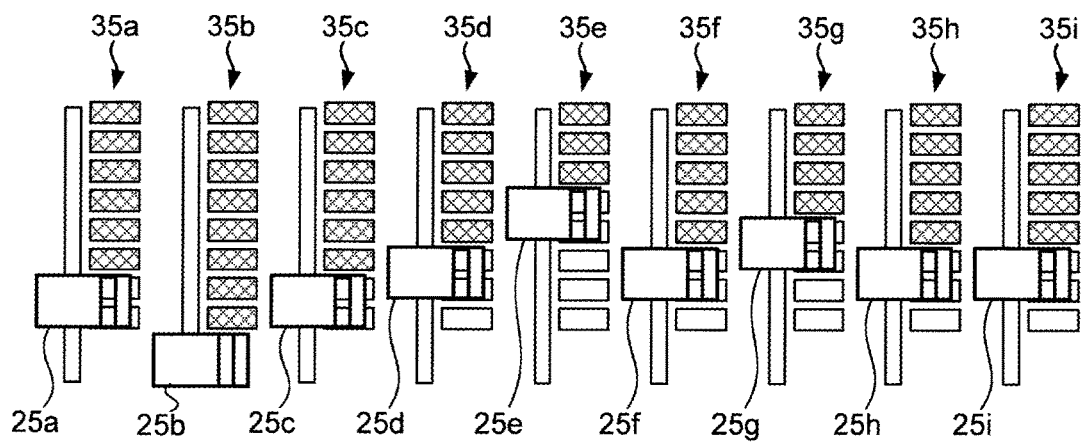
FIG. 6 is a diagram illustrating a relationship between a slide operating element and a light-emitting area (when registering a setting) according to the first embodiment of the present disclosure.

FIG. 6 is a diagram illustrating a relationship between the slide operating element and a light-emitting area (when registering the setting) in the first embodiment of the present disclosure. In FIG. 6, the indicated positions of the slide operating elements 25a to 25i are "6", "8", "6", "5", "3", "5", "4", "5" and "5". The indicator units 35a to 35i emit light corresponding to the indicated positions. That is, up to the number of the display surfaces from the backmost display surface 35-1 to the number of that corresponding to the indicated positions of the slide operating element 25 emit light. According to the example of FIG. 3, the indication value of the slide operating element 25 is "4" and four display surfaces corresponding to the display surfaces 35-1 to 35-4 emit light. In the state shown in FIG. 6, it is assumed that an instruction for registering the setting with respect to the indicated position of the slide operating element 25 is input into the operation unit 70. As a result, the indicated positions of the slide operating elements 25a to 25i described above are registered as the setting data in the setting storage area 181.

As shown in FIG. 6, even when the adjacent slide operating elements 25 are close, having a portion overlapping the slide operating element 25 and the indicator unit 35 in the correspondence. Therefore, the user can clearly visually recognize the correspondence between the slide operating element 25 and the indicator unit 35. Since the light-emitting area continues from the backmost display surface to the slide operating element 25, the user can visually recognize the setting value in a sense similar to that when drawing out the drawbar of the tone-wheel organ.

Figure 7:
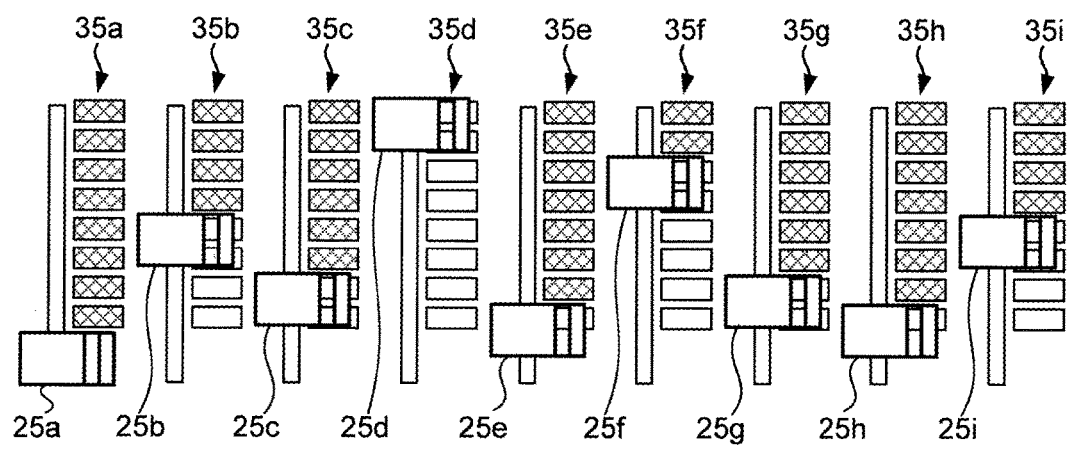
FIG. 7 is a diagram illustrating a relationship between the slide operating element and the light-emitting area (when changing the setting) according to the first embodiment of the present disclosure.

FIG. 7 is a diagram illustrating a relationship between the slide operating element and the light-emitting area (when changing the setting) in the first embodiment of the present disclosure. FIG. 7 shows an example in which the user moves the slide operating element 25 to change the indicated position in the state shown in FIG. 6. In FIG. 7, the indicated positions of the slide operating elements 25a to 25i are in the order of "8", "4", "6", "0", "7", "2", "6", "7" and "4". The indicator units 35a to 35i emit light corresponding to the indicated positions. Thus, the light-emitting area of the indicator units 35 to 35i changes according to the setting value. The tone to be output is also changed to a tone corresponding to the indicated position shown in FIG. 7.

Figure 8:
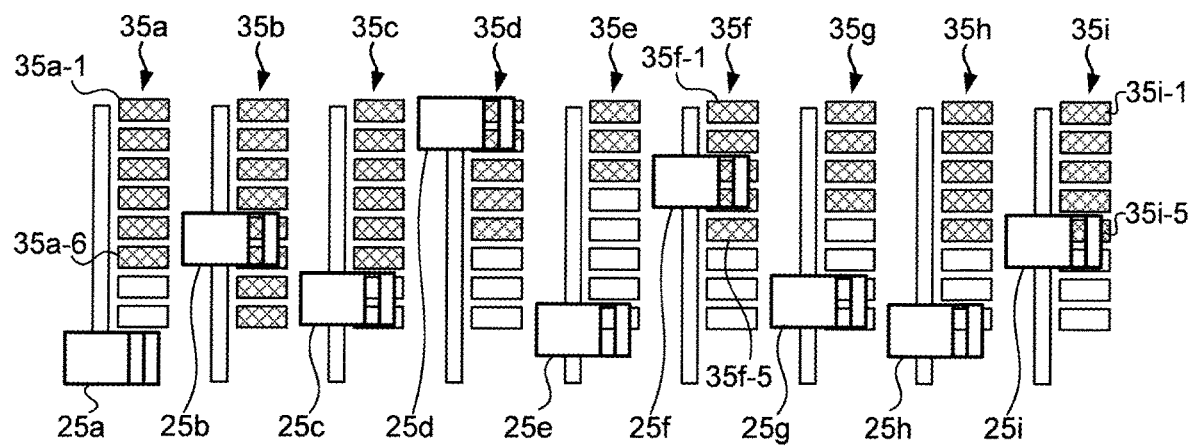
FIG. 8 is a diagram illustrating a relationship between the slide operating element and the light-emitting area (when updating the setting) according to the first embodiment of the present disclosure.

FIG. 8 is a diagram illustrating a relationship between the slide operating element and the light-emitting area (when updating the setting) in the first embodiment of the present disclosure. FIG. 8 is an example in which an instruction for updating the setting with respect to the indicated position of the slide operating element 25 is input to the operation unit 70 in the state shown in FIG. 7. The setting data read out here is the setting data registered in FIG. 6. Therefore, in FIG. 8, while the indicated position of the slide operating element 25 is as shown in FIG. 7, the light-emitting area of the indicator unit 35 is as shown in FIG. 6. The output tone is not a tone corresponding to the indicated position of the slide operating element 25 shown in FIG. 7 but is changed to a tone corresponding to the indicated position shown in FIG. 6.

In the indicator unit 35a, the display surfaces 35a-1 to 35a-6 are emitting light. Since the slide operating element 25a is positioned at the indicated position "8", the light-emitting area is not covered with the slide operating element 25a. Therefore, the user can easily visually recognize that the setting value corresponding to the slide operating element 25a after the update is updated to "6".

In the indicator unit 35i, the display surfaces 35i-1 to 35i-5 are emitting light. Since the slide operating element 25i is positioned at the indicated position "5", a part of the light-emitting area (the display surface 35i-5) is covered with the slide operating element 25i. Even in this condition, light in a part of the light-emitting area in the display surface 35i-5 passes through the light-transmitting portion of the slide operating element 25i. Therefore, the user can easily visually recognize that the setting value corresponding to the slide operating element 25i is "5".

On the other hand, if there is no light-transmitting portion of the slide operating element 25i, only the display surface 35i-5 of the portion of the light-emitting area that is not covered with the slide operating element 25i can be visually recognized. Therefore, visibility when checking whether the setting value is "5" or "4" is low. Depending on the form of the operating element, as in the embodiment described below, the slide operating element 25i completely covers the display surface 35i-5. Therefore, the user cannot visually recognize, for example, whether or not the display surface 35i-5 is emitting light.

In an indicator unit 35f, display surfaces 35f-1 to 35f-5 are emitting light. Since a slide operating element 25f is positioned at the indicated position "2", a part of the light-emitting area (the display surfaces 35f-3, 35f-4) is covered with the slide operating element 25f. On the other hand, since the display surface 35f-5 is not covered with the slide operating element 25f, the user can visually recognize that setting value is "5". Here, part of the light emitted from the light-emitting areas of the display surfaces 35f-3 and 35f-4 passes through the light-transmitting portion of the slide operating element 25f. Therefore, since the light emission from the display surfaces 35f-1 to 35f-5 continues, the user can visually recognize that the setting data read out is "5" even when the slide operating element 25f is not positioned at the indicated position "5", and the appearance similar to that when drawing out the drawbar is maintained.

When the slide operating element 25 is operated in this state, the light-emitting area changes to correspond to the indicated position. The light-emitting area of the indicator unit 35 corresponding to the slide operating element 25 operated may change. For example, when moving the slide operating element 25f, only the indicated position corresponding to the slide operating element 25f is changed, the light-emitting area of only the indicator unit 35f may be changed to correspond to the indicated position. The light-emitting area of the indicator unit 35 corresponding to all the slide operating element 25 may change. For example, when the indicated position of the slide operating element 25f is changed, the indicated positions of all the slide operating elements 25a to 25i may also be changed together, and the light-emitting areas of the indicator units 35a to 35i may change to correspond to the indicated positions.

As described above, by having the overlapping region CA in the relationship between the slide operating element 25 and the display surface of the indicator unit 35, the user can easily recognize the correspondence between the two. By providing a light-transmitting portion on at least a part of the overlapping region CA of the slide operating element 25, even when the light emission in the indicator unit 35 is covered with the slide operating element 25 in the overlapping region CA, the light is guided to the outer surface side of the slide operating element 25, it can be visually recognized by the user. Compared to when all of the slide operating elements 25 is formed of the light-transmission member, the visibility of the slide operating element 25 itself can also be improved by combining the light-blocking member and the light-transmission member, and further by arranging the light-transmission member so as to be sandwiched between the light-blocking member.

Second Embodiment

In the second embodiment, of the lateral ends 251S, 253S in the slide operating element 25, the setting device 2A including a light-emitting device 30A having an indicator unit 35A where both the ends 251S and 253S are positioned on the outside of the overlapping region CA will be described.

Figure 9:
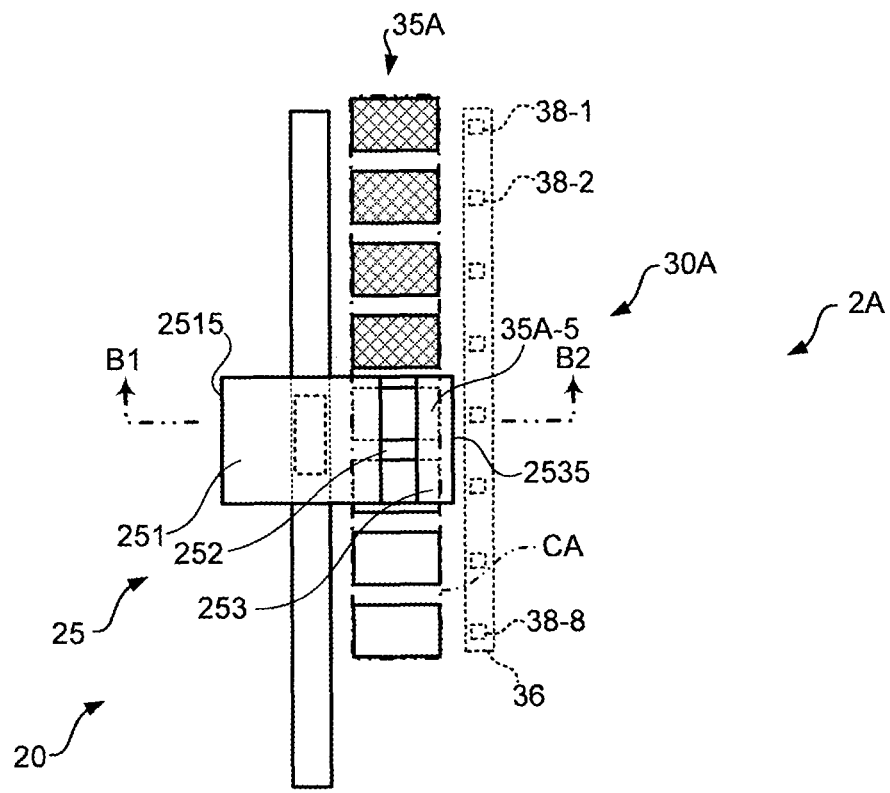
FIG. 9 is a diagram illustrating an external view of a setting device according to a second embodiment of the present disclosure.
Figure 10:
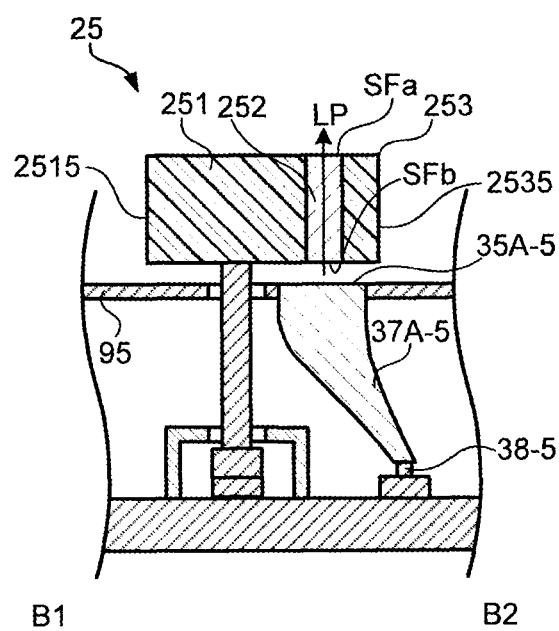
FIG. 10 is a diagram illustrating a cross-sectional structure of the setting device according to the second embodiment of the present disclosure.

FIG. 9 is a diagram illustrating an external view of the setting device according to the second embodiment of the present disclosure. FIG. 10 is a diagram illustrating a cross-sectional structure of the setting device according to the second embodiment of the present disclosure. The indicator unit 35A is narrow in the lateral direction of the respective display surface as compared with the indicator unit 35 in the first embodiment. Therefore, a light guiding member 37A is different in form from the light guiding member 37 in the first embodiment.

In this example, both the end portions 251S and 253S of the slide operating element 25 are positioned on the outside of the overlapping region CA. Therefore, as shown in FIG. 9, when the slide operating element 25 is positioned at the indicated position "4", a display surface 35A-5 is completely covered with the slide operating element 25. Even in such a positional relation between the slide operating element 25 and the indicator unit 35A, when the light emitted by the light-emitting element 38-5 is guided by the light guiding member 37A-5 and the display surface 35A-5 emits light, the user can visually recognize the light emission from the outer surface side of the slide operating element 25 via the light guide path LP realized by the light-transmission member 252.

Third Embodiment

In the third embodiment, a setting device 2B including an indicator unit 35B only the display surface corresponding to the indicated position of the slide operating element 25 emits light will be described.

Figure 11:
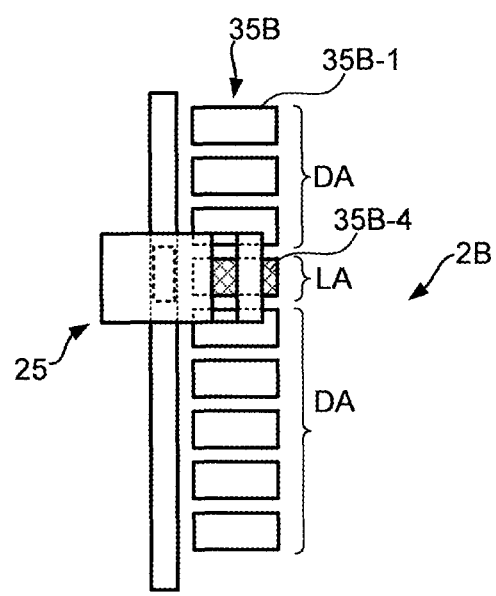
FIG. 11 is a diagram illustrating an external view of a setting device according to a third embodiment of the present disclosure.

FIG. 11 is a diagram illustrating an external view of a setting device according to the third embodiment of the present disclosure. In this example, of the indicator unit 35B, only the display surface (the display surface 35B-4 in the example of FIG. 11) covered with the slide operating element 25 emits light. The display surface adjacent to the display surface 35B-4 may also be displayed. One of the display surfaces not covered with the slide operating element 25 (e.g., the display surface on the backside of the slide operating element 25) may emit light. In this way, the light-emitting area continuous from the display surface 35B-1 arranged at the backmost may not be formed.

Fourth Embodiment

In the fourth embodiment, a setting device 2C including an indicator unit 35C including a sequential display surface, not the display surface separated from each other, will be described.

Figure 12:
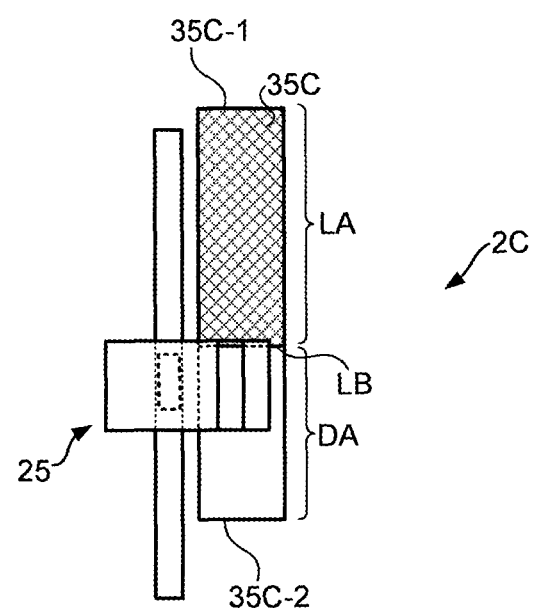
FIG. 12 is a diagram illustrating an external view of a setting device according to a fourth embodiment of the present disclosure.

FIG. 12 is a diagram illustrating an external view of a setting device according to the fourth embodiment of the present disclosure. The indicator unit 35C includes a display surface that can continuously vary the light-emitting area, such as, for example, a liquid crystal display, an organic EL display, and the like. In this example, the light guiding member 37 and the light-emitting element 38 is not required, the display content of the indicator unit 35C is controlled by the light-emitting driver 36.

The light-emitting area changes between an end 35C-1 on the backside and an end 35C-2 on the frontside of the indicator unit 35C. In this example, the light emitting region LA is arranged on the end 35C-1 side and the non-light emitting region DA is arranged on the end 35C-2 side, with the indicated position of the slide operating element 25 as a border LB. In this example, the border LB is substantially coincident with the position of the backside end in the slide operating element 25, but the border LB may be set to be positioned at a substantially central portion of the slide operating element 25, as shown in the third embodiment.

When the light-emitting area can be continuously varied in this way, even when such as to classify the indicated position of the slide operating element 25 in 128 stages, it is possible to accurately display the indicated position in the indicator unit 35C. Even when the parameter value Cp is controlled so that the indicated position is divided into 128 stages, by acquiring the position of the slide operating element 25 with higher resolution, the change in the light-emitting area of the indicator unit 35C may be made to be finely changed to more than 128 stages.

Fifth Embodiment

In the fifth embodiment, a setting device 2D including a slide operating element 25D in which the light guide path LP is formed by a through hole in place of the light-transmission member 252 will be described.

Figure 13:
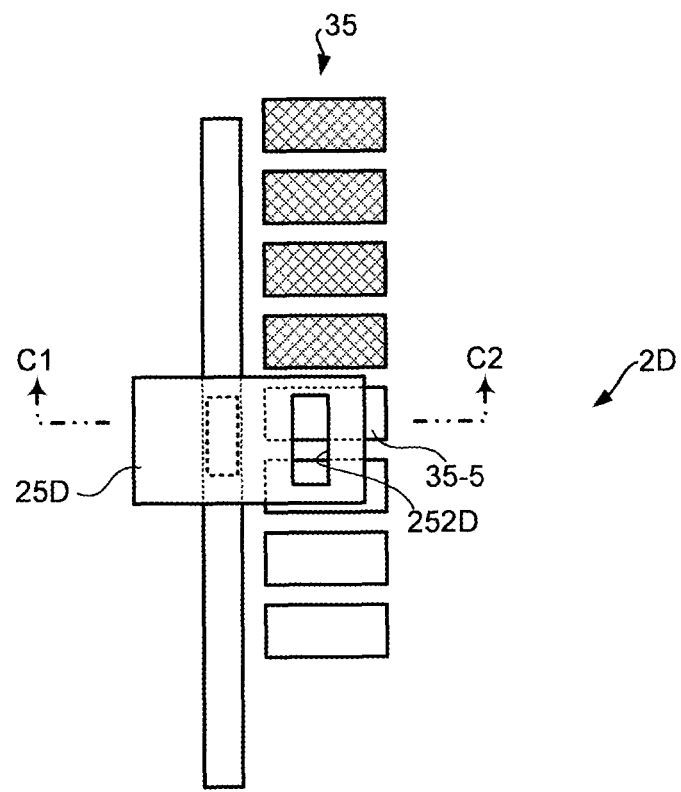
FIG. 13 is a diagram illustrating an external view of a setting device according to a fifth embodiment of the present disclosure.
Figure 14:
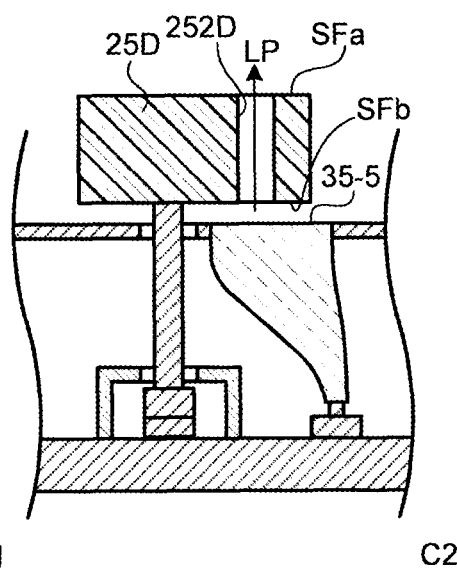
FIG. 14 is a diagram illustrating a cross-sectional structure of the setting device according to the fifth embodiment of the present disclosure.

FIG. 13 is a diagram illustrating an external view of a setting device according to the fifth embodiment of the present disclosure. FIG. 14 is a diagram illustrating a cross-sectional structure of a setting device according to a fifth embodiment of the present disclosure. The slide operating element 25D is provided with a through hole 252D that penetrates between the upper surface SFa and the lower surface SFb. The user can directly view the display surface (the display surface 35-5 in the example of FIG. 13) through the through hole 252D. As described above, the part of the slide operating element serving as the light guide path LP is not limited to the case of using the light-transmission member and may be formed by space. This space is not limited to being realized by one through hole but may be realized by a mesh-like structure or may be realized by using a plurality of through holes.

Sixth Embodiment

In the sixth embodiment, a setting device 2E including a slide operating element 25E in which the bent light guide path LP is provided will be described.

Figure 15:
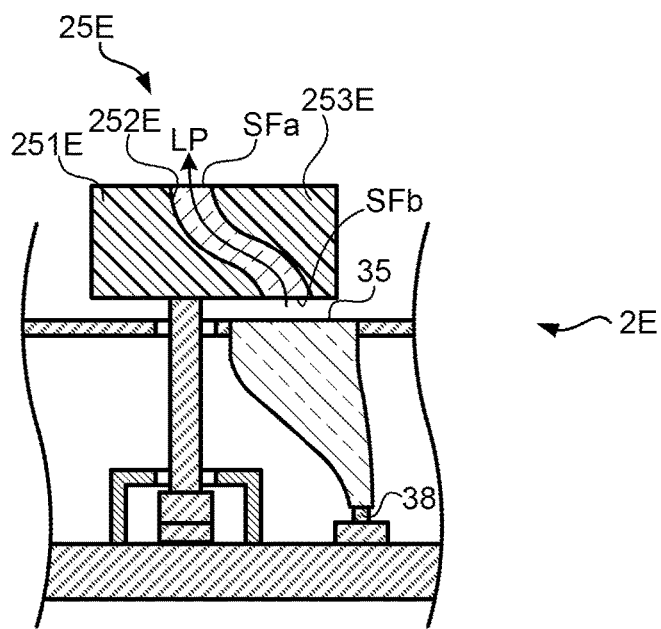
FIG. 15 is a diagram illustrating a cross-sectional structure of a setting device according to a sixth embodiment of the present disclosure.

FIG. 15 is a diagram illustrating a cross-sectional structure of a setting device according to a sixth embodiment of the present disclosure. The slide operating element 25E includes a light-transmission member 252E sandwiched between a light-blocking member 251E and a light-blocking member 253E. The light-transmission member 252E has a curved surface shape. In the light-transmission member 252E, the portion exposed on the lower surface SFb and the portion exposed on the upper surface SFa are shifted in the lateral direction. When the light-transmission member 252E has such a configuration, a reflective material may be provided at the interface between the light-transmission member 252E and the light-blocking members 251E, 253E, or a light diffusing material may be provided in the light-transmission member 252E so that the light emitted from the display surface is efficiently guided from the lower surface SFb to the upper surface SFa.

In the light-transmission member 252E, the area of the portion exposed to the lower surface SFb and the area of the portion exposed to the upper surface SFa may be different from each other. Depending on the visibility required, the area of the lower surface SFb side may be increased, or the area of the upper surface SFa side may be increased.

Seventh Embodiment

In the seventh embodiment, a setting device 2F including a rotating operating element 25F such as rotary encoders rather than the slide operating element will be described.

Figure 16:
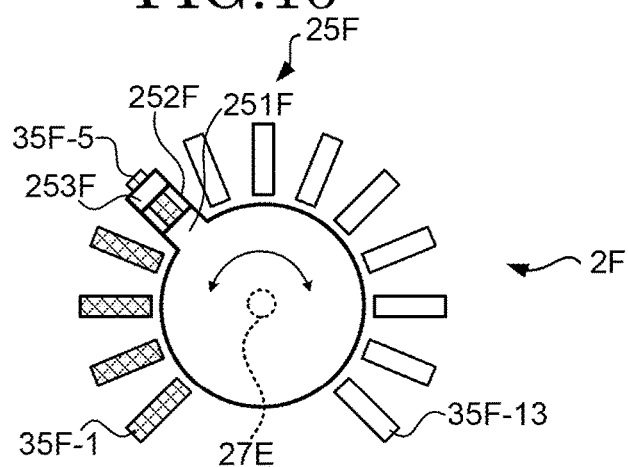
FIG. 16 is a diagram illustrating a relationship between an operating element and a light-emitting area (when changing the setting) according to a seventh embodiment of the present disclosure.

FIG. 16 is a diagram illustrating a relationship between the operating element and the light-emitting area (when changing the setting) in the seventh embodiment of the present disclosure. The rotating operating element 25F rotates with respect to an axis 27E. The rotating operating element 25F includes light-blocking members 251F, 253F, and a light-transmission member 252F. The light-blocking member 251F has a substantially cylindrical shape and includes a portion protruding from a side surface of the cylindrical shape. The light-transmission member 252F is connected to the projecting portion. The light-transmission member 252F is sandwiched between the light-blocking member 251F and the light-blocking member 253F.

The part where the light-transmission member 252F and the light-blocking member 253F are arranged defines the indicated position of the rotating operating element 25F. In this example, the rotating operating element 25F rotates to point to any of the indicated positions "0" to "12". The indicated positions "0" to "12" correspond to the display surfaces 35 F-1 to 35 F13, respectively. In the example shown in FIG. 16, the rotating operating element 25F indicates the indicated position "4", and the display surfaces 35F-1 to 35F-5 corresponding to the indicated position are emitting light. Even in this state, a part of the light emitted from the display surface 35F-5 passes through the light-transmission member 252F, so that the user can visually recognize the light from the outer surface side of the rotating operating element 25F.

Figure 17:
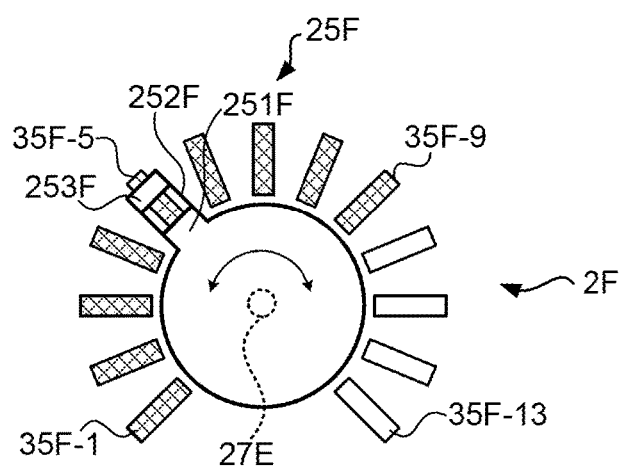
FIG. 17 is a diagram illustrating the relationship between the operating element and the light-emitting area (when updating the setting) according to the seventh embodiment of the present disclosure.

FIG. 17 is a diagram illustrating a relationship between the operating element and the light-emitting area (when updating the setting) in the seventh embodiment of the present disclosure. When the setting value is updated to the indicated position "8" by the setting updating instruction, the light-emitting area changes so that the display surfaces 35F-1 to 35 F-9 emit light. The state of FIG. 17 is maintained until the rotating operating element 25F is further rotated.

<Modifications>

While an embodiment of the present disclosure has been described above, the embodiment of the present disclosure may also be modified into various forms as follows. The embodiment described above and the modifications described below can be applied in combination with each other. Further, it is possible to add, delete, or replace a part of the configuration of each embodiment with another configuration. In the following description, examples when modifying the first embodiment will be described, but may be applied to other embodiments.

(1) Emission colors of the display surface in the indicator unit 35 may be changed by the setting. The emission colors may be changed according to the parameter setting value or may be different for each display surface. Either of the indicator units 35 may have a different color from the other. When the slide operating element 25 is used like a drawbar in the tone-wheel organ having a two-stage keyboard, the light emission colors may differ between the case of setting for the upper-stage keyboard and the case of setting for the lower-stage keyboard.

(2) The display surfaces 35-1 to 35-8 may have a shape other than a rectangle or may have a character shape. Any of the display surfaces 35-1 to 35-8 may have a shape different from the others.

(3) The light-transmission member 252 used in the slide operating element 25 may not be connected from the end on the frontside to the end on the backside of the slide operating element 25. In this example, the light-blocking member 251 and the light-blocking member 253 may be an integral structure.

(4) The light-blocking member 253 may not be present in the slide operating element 25. In this example, the light-blocking member 251 and the light-transmission member 252 is connected, one of the ends of the slide operating element 25 in the lateral direction is made of the light-transmission member 252, the other is made of the light-blocking member 251.

(5) The control unit 10 may display an image corresponding to the slide operating element 25 and an image corresponding to the indicator unit 35 on the display unit 50 as viewed from above. When a touch sensor is provided in the display unit 50, in response to the user operating the image of the slide operating element 25, the control unit 10 changes the image displayed on the display unit 50 so as to reproduce the same movement as the actual the slide operating element 25, and generates the operation values SaV to SiV according to the position of the image. Such images may be displayed on a display unit of the external device connected wirelessly or by wire to the electronic keyboard device 1.

In this example, the electronic keyboard device 1 has a function of communicating with the external device (in this example, a communication device 1000) by wire or wirelessly.

Figure 18:
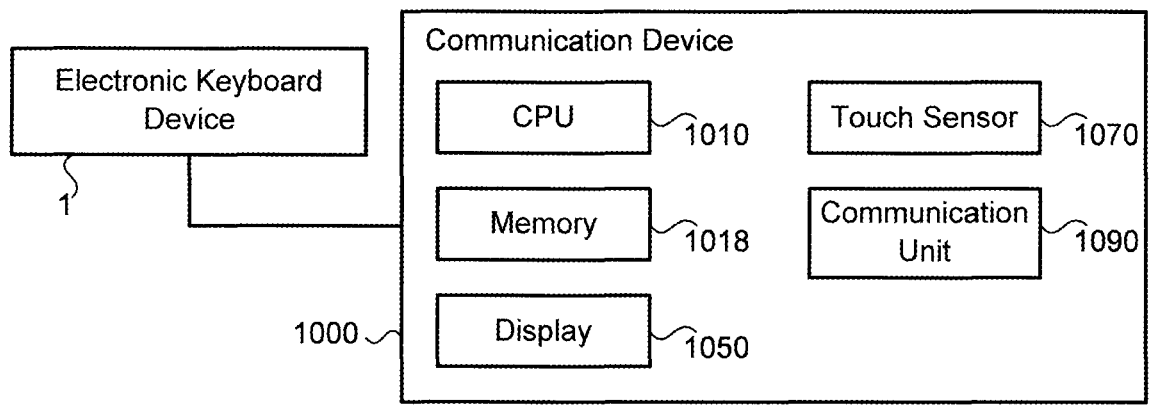
FIG. 18 is a diagram illustrating a configuration of a communication device according to a modification of the present disclosure.

FIG. 18 is a diagram illustrating a configuration of a communication device according to a modification of the present disclosure. The communication device 1000 is, for example, a portable terminal such as a smart phone or a tablet terminal and includes a display 1050 provided with a touch sensor 1070. The communication device 1000 includes a communication unit 1090 for communicating with the electronic keyboard device 1. The communication device 1000 executes a program installed in advance and stored in a memory 1018 by a CPU 1010 to realize the following setting functions. The setting function relates to the function of the setting device described above.

Figure 19:
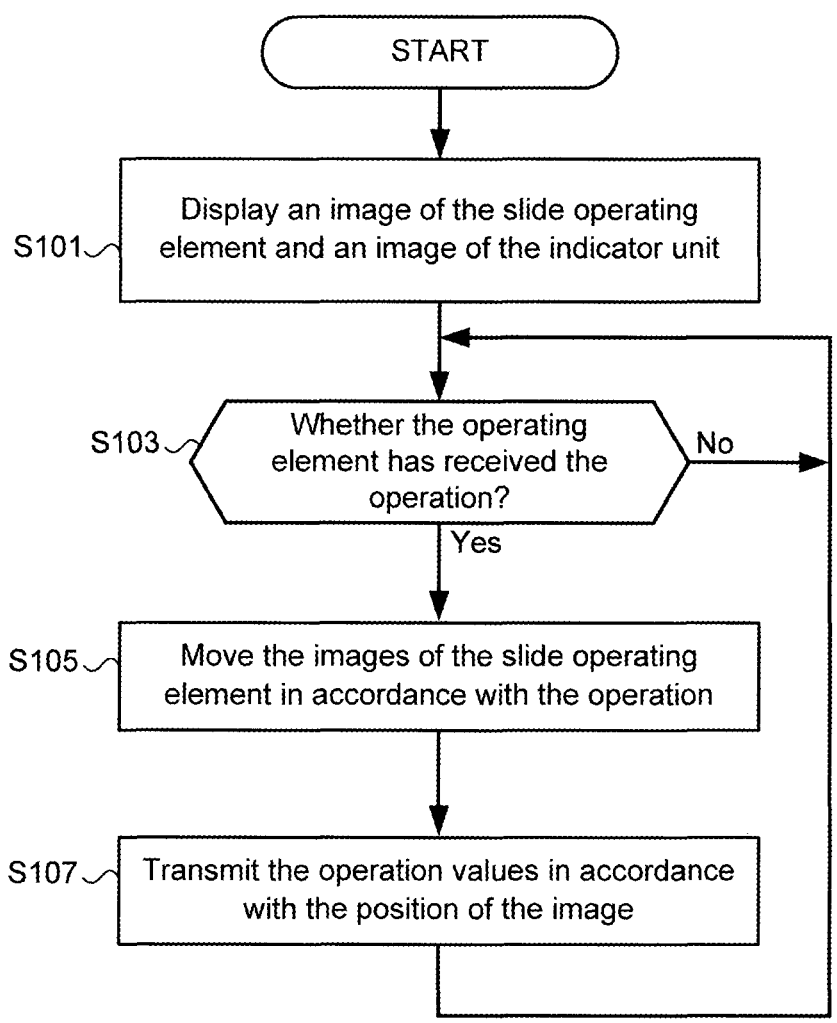
FIG. 19 is a flowchart illustrating a processing of setting functions according to the modification of the present disclosure.

FIG. 19 is a flowchart illustrating the processing of the setting function in the modification of the present disclosure. The CPU 1010 causes the display 1050 to display an image corresponding to the slide operating element 25 and an image corresponding to the indicator unit 35 (step S101). The CPU 1010 waits until the touch sensor 1070 receives the operation for the slide operating element 25 displayed on the display 1050 (step S103; No). In response to receiving this operation (step S103; YES), the CPU 1010 controls the display 1050 to move the images of the slide operating element 25in accordance with the operation (step S105). This causes the same motion as the actual the slide operating element 25 to be reproduced on the display 1050. The CPU 1010 controls the communication unit 1090 to generate and transmit the operation values SaV to SiV to the electronic keyboard device 1 in accordance with the operation for the image (the position of the image) (step S107). The electronic keyboard device 1 handles the received operation values SaV to SiV in the same manner as if the slide operating element 25 were operated.

The electronic keyboard device 1 may move the positions of the slide operating elements 25a to 25i based on the received operation values SaV to SiV so that the images of the slide operating element 25 displayed on the display 1050 of the communication device 1000 and the slide operating element 25 of the electronic keyboard device 1 move together. In this example, the electronic keyboard device 1 may include a driver for moving the slide operating element 25.

On the contrary, the electronic keyboard device 1 may transmit the operation values SaV to SiV to the communication device in response to the operations to the slide operating element 25. The CPU 1010 of the communication device 1000 may move the position of the images of the slide operating element 25 displayed on the display 1050 based on the received operation values SaV to SiV.

The above description relates to the modification.

The setting device according to an embodiment of the present disclosure includes an operating element and a light-emitting device. The operating element is used for specifying a setting value of a first parameter by moving the operating element within a first region. The light-emitting device includes a second region that is disposed inside the first region. The second region includes a light-emitting area that changes according to the setting value. The operating element covers part of the second region. The setting device can also be further configured as follows.

The light-emitting device may include a light-emitting element and a light guiding member configured to guide light from the light-emitting element to the operating element. Light is emitted from the light-emitting area and passes through part of the operating element.

The first region may be a region having a longitudinal length in a first direction. The light-emitting area may change along the first direction. The operating element includes a light transmissive portion. The light guiding member may guide light to the light transmissive portion, which has a longitudinal length in the first direction of the outer surface of the operating element.

A length from a first end of the second region in the first direction to a second end of the second region may be shorter than a length from a first end of the first region in the first direction to a second end of the first region. A distance between the first end of the second region and the first end of the first region may be shorter than a distance between the second end of the second region and the second end of the first region. The light-emitting area may include at least a part of a region between the part covered with the operating element of the second region and the first end of the second region.

In a second direction orthogonal to the first direction, at least on end of the operating element may position outside the second region.

The setting device may further include a controller configured to update the setting value based on information read from a memory.

The light-emitting device may include a plurality of the light-emitting element and a plurality of light guiding members each associated with one of the plurality of light-emitting elements to guide light from the associated light-emitting element to the second region. The plurality of light-emitting elements may be arranged outside the second region.

The operating element according to an embodiment of the present disclosure is an operating element for specifying a setting value of a first parameter related to sound by moving the operating element relative to a housing. The operating element includes a first portion and a second portion. The first portion blocks light. The second portion transmits the light from a first surface of the operating element to a second surface facing the first surface. The operating element may be further configured as follows.

The second portion may divide the first portion into two regions.

A setting method includes a first image, the first image corresponding to an operating element movable within a first region for specifying a setting value of a first parameter, the second image corresponding to a light-emitting device including a second region that is inside the first region, the second region including a light-emitting area that changes depending on the setting value, the operating element covering part of the second region, and transmitting information for specifying the setting value depending on a position of the first image in response to receiving an operation of the operating element in the first image.

What is claimed is:

1. A setting device comprising:
an operating element configured to specify a setting value of a first parameter by moving the operating element within a first region that has a first longitudinal length in a first direction; and
a light-emitting device including a second region that is disposed inside the first region,
wherein the second region includes a light-emitting area that changes along the first direction according to the setting value, and
wherein the operating element covers part of the second region light-emitting area.

2. The setting device according to claim 1, wherein:
the light-emitting device includes a light-emitting element and a light guiding member configured to guide light from the light-emitting element to the operating element, and
light is emitted from the light-emitting area and passes through part of the operating element.

3. The setting device according to claim 2, wherein:
the operating element includes a light transmissive portion, and
the light guiding member guides light to the light transmissive portion, which has a second longitudinal length in the first direction on the outer surface of the operating element.

4. The setting device according to claim 3, wherein:
a first length from a first end of the second region in the first direction to a second end of the second region is shorter than a second length from a first end of the first region in the first direction to a second end of the first region,
a first distance between the first end of the second region and the first end of the first region is shorter than a second distance between the second end of the second region and the second end of the first region, and
the light-emitting area includes at least part of a region between the part covered with the operating element of the second region and the first end of the second region.

5. The setting device according to claim 3, wherein, in a second direction orthogonal to the first direction, at least one end of the operating element is positioned positions outside the second region.

6. The setting device according to claim 2, further comprising a controller configured to update the setting value based on information read from a memory.

7. The setting device according to claim 1, wherein:
the light-emitting device includes a plurality of the light-emitting element and a plurality of light guiding members each associated with one of the plurality of light-emitting elements to guide light from the associated light-emitting element to the second region, and
the plurality of light-emitting elements are arranged outside the second region.

8. A setting method comprising:
displaying a first image and a second image, the first image corresponding to an operating element movable within a first region for specifying a setting value of a first parameter, the second image corresponding to a light-emitting device including a second region that is disposed inside the first region,
wherein the first region has a first longitudinal length in a first direction,
wherein the second region includes a light-emitting area that changes along the first direction according to the setting value,
wherein the operating element covering part of the light emitting area; and
transmitting information for specifying the setting value depending on a position of the first image in response to receiving an operation of the operating element in the first image.

* * * * *